Nov. 14, 1961     E. J. H. FIALA     3,008,728
SHOCK ABSORBING SYSTEM FOR A VEHICLE
Filed Dec. 8, 1958
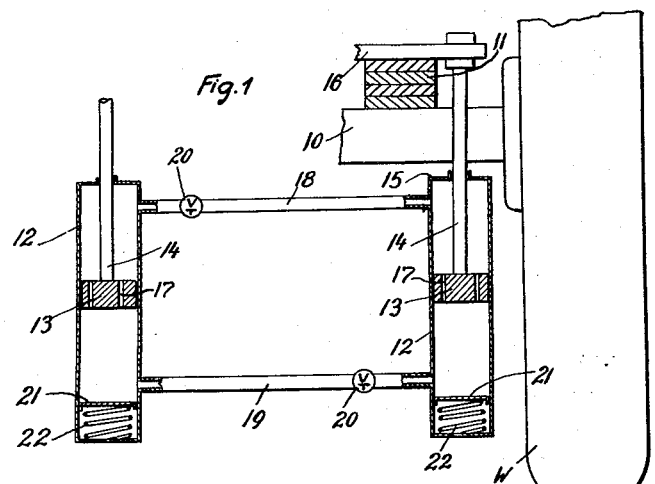
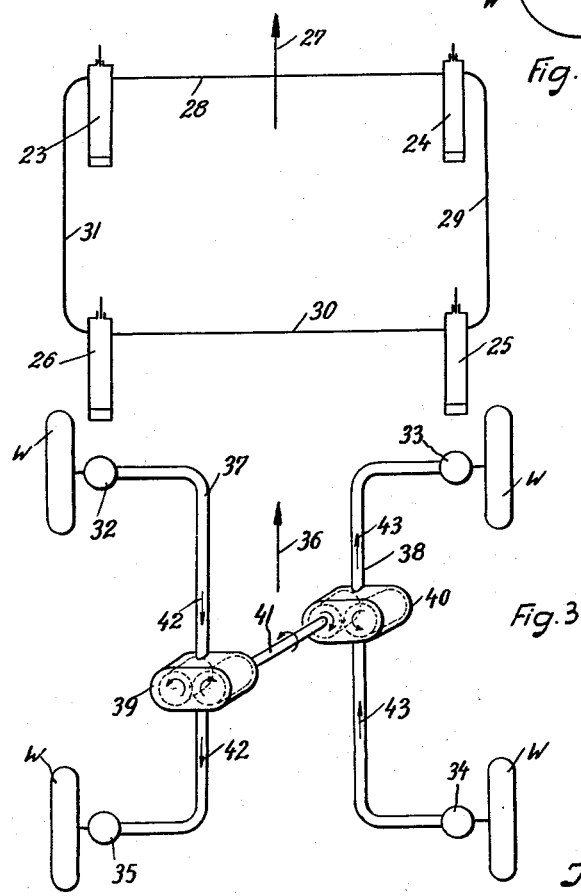
Inventor
ERNST J. H. FIALA
BY Dickand Craig
ATTORNEYS United States Patent Office
3,008,728
Patented Nov. 14, 1961

3,008,728
SHOCK ABSORBING SYSTEM FOR A VEHICLE
Ernst J. H. Fiala, Sindelfingen, Kreis Boblingen, Germany, assignor to Daimler-Benz Aktiengesellschaft, Stuttgart-Unterturkheim, Germany
Filed Dec. 8, 1958, Ser. No. 779,001
Claims priority, application Germany Dec. 10, 1957
7 Claims. (Cl. 280—104)

My invention relates to a shock absorbing system for a vehicle and more particularly to a hydraulic shock absorbing system for a motor vehicle.

Systems of this type comprise shock absorbers individually coordinated to the wheels of the vehicle for exerting forces thereon which counteract springing movements of the wheels relative to the body of the vehicle to thereby dampen the oscillating springing movements to prevent their resonant rise under adverse conditions of travel. It is the primary object of my invention to considerably reduce or nearly completely eliminate the torsional stresses and strains exerted upon the body of the vehicle by the forces produced by the shock absorbers.

More specifically, it is the object of my invention to so control such counteracting forces exerted by the shock absorbers on the wheels of the vehicle that these forces will dampen vertical movements of the vehicle and rotary oscillations about the central transverse axis of the vehicle considerably while producing a reduced damping effect on angular motions of the vehicle about its horizontal longitudinal axis and on such springing oscillations of diagonally opposite wheels as occur in the same direction and have the same phase. As a result, torsional stresses and strains exerted on the body of the vehicle by the forces produced by the shock absorbers will be greatly reduced.

It is a further object of my invention to provide an improved hydraulic shock absorbing system which while exerting a minimum of torsional stress upon the body of the vehicle will nevertheless effectively dampen the undesirable springing oscillations of the vehicle and, more particularly, oscillations about the horizontal transverse central axis of the vehicle.

Finally, it is the object of my invention to provide an improved hydraulic shock absorbing system which will effectively dampen vertical oscillations of the vehicle without substantially dampening rotary oscillations thereof.

Further objects of my invention will appear from a detailed description of various embodiments thereof following hereinafter with reference to the accompanying drawing. I wish it to be clearly understood, however, that my invention is in no way limited to the details of such embodiments but is capable of numerous modifications within the scope of the appended claims and that the phrases and terms used in such detailed description have been chosen for the purpose of explaining the invention rather than that of restricting or limiting the same.

In the drawing

FIG. 1 is a diagrammatic partial vertical transverse section taken through a vehicle and showing one of a pair of opposite wheels of an axle and a pair of hydraulic shock absorbers individually coordinated to these wheels, FIG. 2 is a diagrammatic plan view of a hydraulic shock absorbing system of a four-wheeled vehicle illustrating the four shock absorbers individually coordinated to the wheels, and FIG. 3 is a plan view of another hydraulic shock absorbing system for a four-wheeled vehicle in which the four shock absorbers individually coordinated to the wheels are indicated diagrammatically.

In FIG. 1 a pair of hydraulic shock absorbers of the piston type is shown, each shock absorber being coordinated to one wheel of a pair of opposite wheels of a motor vehicle. The mode of the coordination of the shock absorber to the wheel depends on the particular springing system. FIG. 1 illustrates a system in which the pair of opposite wheels is mounted on a common axle 10 carrying semi-elliptical leaf springs 11 supporting the body of the vehicle. Each hydraulic shock absorber comprises a cylinder 12 rigidly connected to the body of the vehicle and a piston 13 slidably mounted in the cylinder 12 and having a piston rod 14 which extends through the cylinder cover 15 and is suitably connected to a wheel-carrying element for common up and down movement therewith relative to the body. In the example illustrated in FIG. 1 the piston rod 14 is rigidly connected to a clamping member 16 serving to fix one of the leaf springs 11 to the axle 10. Restricted passage-ways 17 extend through the pistons 13 affording the liquid displaced by relative movement of cylinder and piston a possibility to be displaced from one cylinder chamber and to escape into the other cylinder chamber. In this operation the shock absorbers exert forces upon the wheels W and the body of the vehicle which counteract the relative springing movements of the body and the wheels and thus dampen a resonant rise of oscillating springing movements.

For the purpose of reducing such counteracting forces with respect to such relative springing movements as result from oscillations of the vehicle about its longitudinal axis I have provided compensating conduits 18 and 19 connecting the shock absorbers of the opposite wheels W with each other. More particularly, the conduit 18 establishes a communication between the hydraulic shock absorbers above the pistons 13, whereas the conduit 19 establishes a communication between the hydraulic shock absorbers below their pistons 13. As a result, greatly reduced counteracting forces only will be produced by such springing movements of the wheels in which one wheel moves in a direction opposite to the other. Assuming, for instance, that the right-hand wheel in FIG. 1 moves upwardly, whereas the left-hand wheel (not shown) moves downwardly causing the right-hand piston to ascend and the left-hand piston 13 to descend, the liquid displaced from the upper chamber of the right-hand cylinder 12 and from the lower chamber of the left-hand cylinder 12 may freely pass through the compensating conduit 18, or 19 respectively, and be taken in by the opposite cylinder. The magnitude of the greatly reduced counteracting forces produced by the shock absorbers in this operation depends on the cross section of the compensating conduits 18 and 19. If desired, the compensating conduits may be equipped with adjustable throttle valves 20.

It will be readily understood that while the hydraulic shock absorbing system described hereinabove with reference to FIG. 1 including the compensating conduits 18 and 19 has a greatly reduced dampening effect with respect to springing oscillations of the vehicle body about its longitudinal axis, it produces powerful counteracting forces with respect to such springing movements of the pair of wheels W as occur simultaneously in the same direction, because simultaneous ascent or descent of the pistons 13 in the cylinders 12 fails to produce any compensating flow of liquid through the conduits 18 and 19.

The compensating conduit 19 connecting the lower chambers of the cylinders 12 may be omitted, provided that the bottom wall of each shock absorbing cylinder 12 is constituted by a plunger 21 supported by a spring 22 which rests on an internal flange provided at the open lower end of the cylinder 12. Discharge of liquid from one of the cylinders 12 and the feeding of this liquid into the other cylinder 12 through the conduit 18 will be compensated by displacement of the plungers 21 in the cylinders. At the same time the plungers 21 constitute resilient buffers limiting the piston displacement in event of shock-like overloads acting on the shock absorbers.

In FIG. 2 I have diagrammatically indicated four shock-absorbers 23, 24, 25 and 26 each of which is coordinated to one wheel of a four-wheeled vehicle, the longitudinal axis and the direction of travel of the vehicle being indicated by the arrow 27. Each of the four shock absorbers is of the type shown in FIG. 1 including the plunger 21. The upper chambers of the four shock absorber cylinders are interconnected by a pipe circuit comprising a pipe section 28 extending between the shock absorbers 23 and 24, a pipe section 29 extending between the shock absorbers 24 and 25, a pipe section 30 extending between the shock absorbers 25 and 26 and a pipe section 31 extending between the shock absorbers 26 and 23. If desired, throttle valves may be inserted in the pipe sections 28, 29, 30 and 31. This hydraulic shock absorbing system will exert a greatly reduced dampening effect upon angular springing oscillations of the vehicle body about its longitudinal axis indicated by the arrows 27 and about its transverse axis. Moreover, the counteracting forces exerted by the shock absorbers are greatly reduced with respect to such conditions of travel in which one set of diagonally opposite wheels moves in a direction opposite to that of the other set of diagonally opposite wheels because movement of the pistons of shock absorbers 23 and 25 in one direction and simultaneous movement of the pistons of the shock absorbers 24 and 26 in the opposite direction will permit the liquid displaced from the respective cylinder chambers to flow through the compensating circuit rather than through the restricted passageways 17 of the pistons.

In FIG. 3 I have illustrated a hydraulic shock absorbing system for a four-wheeled vehicle which counteracts rotary springing oscillations of the vehicle about its longitudinal axis, rotary spring oscillations of the vehicle about its transverse axis and translatory up and down springing movements of the vehicle, but exerts a greatly reduced dampening effect upon oppositely directed springing movements of the two sets of diagonally opposite wheels.

This shock absorbing system comprises four hydraulic shock absorbers 32, 33, 34 and 35 of the piston type which may be constructed as shown in FIG. 1 and are individually coordinated to the four wheels W of the vehicle. The longitudinal axis of the vehicle and the direction of its travel are indicated by the arrow 36. A first conduit 37 connects the shock absorbers 32 and 35 associated with the pair of wheels W on the left-hand side of the vehicle. This compensating conduit affords the liquid displaced from the upper chamber of the shock absorber 32, for instance, a possibility of escaping through the conduit 37 into the upper cylinder chamber of the shock absorber 35 when the wheel W of the shock absorber 35 performs a springing movement in the opposite direction. Vice versa, liquid displaced from the shock absorber 35 may escape through the conduit 37 into the shock absorber 32 when the wheel of shock absorber 35 moves upwardly while the wheel of shock absorber 32 moves downwardly.

The shock absorbers 33 and 34 are similarly connected by a compensating conduit 38. While this system so far described would effectively dampen translatory up and down springing movements of the vehicle body and its rotary oscillations about the longitudinal axis 36, it would be incapable of dampening oscillations of the vehicle body about the transverse horizontal axis. In order to obtain such dampening effect in addition, I have provided a pair of hydraulic displacement power devices 39 and 40, each capable of acting as a hydraulic motor and a hydraulic pump. The device 39 is inserted in the conduit 37 and the device 40 is inserted in the conduit 38. Moreover, I have provided means, such as a shaft 41, for coupling the devices 39 and 40 so that passage of liquid through device 39 in one direction, for instance that of arrows 42, causes passage of the liquid through the other device 40 in the opposite direction indicated by the arrows 43.

Each power device 39, 40 may be formed by an ordinary gear pump comprising a pair of meshing gears and a housing closely encasing those gears. However, any other positive displacement pump capable of acting as a fluid motor may be used.

Flow of liquid through the compensating conduits 37 and 38 in the direction of the arrows 42 and 43 occurs when the set of diagonally opposite wheels coordinated to the shock absorbers 32 and 34 performs an upwardly directed springing movement, whereas the other set of diagonally opposite wheels associated with the shock absorbers 33 and 35 performs a downward springing movement. This type of relative springing movements of the wheels produces greatly reduced dampening forces and, hence, saves the vehicle body from undesirable twists.

The embodiment of my invention illustrated in FIG. 3 is preferably used where oscillations of the frequency of the non-springed masses is dampened by oscillation absorbers (mass absorbers). In that event no torsional stresses or greatly reduced torsional stresses are produced by the hydraulic oscillating system.

While the invention has been described in connection with a number of preferred embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Shock absorbing system for a vehicle having four wheels comprising hydraulic shock absorbers of the piston type individually coordinated to said wheels for exerting forces thereon counteracting springing movements of said wheels relative to the body of the vehicle, each of said shock absorbers including a cylinder and a piston movable therein, and compensating means including means interconnecting said shock absorbers consisting of conduits connecting said hydraulic shock absorbers above the pistons therein and affording a possibility for the liquid to be displaced from one of said shock absorbers by springing movement of its associated wheel in one direction and to be taken in by another of said shock absorbers owing to springing movement of the associated wheel in the opposite direction and spring supported plungers movably guided in and sealing said hydraulic shocks absorbers below said pistons.

2. Shock absorbing system for a four-wheeled vehicle comprising hydraulic shock absorbers individually coordinated to the wheels for exerting forces thereon counteracting springing movements of said wheels relative to the body of the vehicle, each of said shock absorbers including a cylinder and a piston movable therein, and means including compensating conduits connecting said shock absorbers for reducing the forces counteracting springing movements in the same direction of two diagonally opposite wheels and springing movement in the opposite direction of the two other diagonally opposite wheels, said means further including spring-supported plungers movably guided in and sealing said hydraulic shock absorbers, said conduits being connected to the cylinders of the shock absorbers on one side of the pistons therein and said plungers sealing said shock absorbers on the other side of said pistons therein.

3. Shock absorbing system for a four-wheeled vehicle having hydraulic shock absorbers individually coordinated to the wheels for exerting forces thereon counteracting springing movements of said wheels relative to the body of the vehicle, each of said shock absorbers including a cylinder and a piston movable therein, and means including conduits connecting said shock absorbers above said pistons for reducing said counteracting forces with respect to such springing movements of said wheels as comprise springing movement in one direction by the left front wheel and the right rear wheel and springing movement in the opposite direction by the right front wheel and the left rear wheel, said means further including spring supported plungers movably guided in and sealing said hydraulic shock absorbers below said pistons.

4. Shock absorbing system for a four-wheeled vehicle comprising hydraulic shock absorbers individually coordinated to the wheels of said vehicle for exerting forces thereon counteracting springing movements of said wheels relative to the body of the vehicle, a first conduit connecting the shock absorbers associated with the pair of wheels on one side of the vehicle and affording the liquid displaced from one shock absorber of said pair by springing movement of the associated wheel in one direction a possibility to escape through said conduit to the shock absorber associated with the other wheel of said pair owing to springing movement of said other wheel in the opposite direction, a second conduit connecting the shock absorbers associated with the other pair of wheels on the other side of the vehicle and affording the liquid displaced from one shock absorber of said other pair by springing movement of the associated wheel in one direction a possibility to escape through said second conduit to the shock absorber associated with the other wheel of said pair owing to springing movement thereof in the opposite direction, a pair of hydraulic displacement power devices each capable of acting as a hydraulic motor and a hydraulic pump, one of said devices being inserted in one of said conduits and the other one of said devices being inserted in the other one of said conduits, and means for coupling said devices so that passage of liquid through one device in one direction causes passage of liquid through the other device in the opposite direction.

5. Shock absorbing system for a vehicle having a plurality of wheels comprising hydraulic shock absorbers individually coordinated to said wheels for exerting forces thereon counteracting springing movements of said wheels relative to the body of said vehicle, each shock absorber including a cylinder and a piston movable therein, conduit means connecting the cylinder of at least one shock absorber on one side of the piston therein with the corresponding end of the cylinder of at least one other shock absorber, and a spring-supported plunger movably guided in and sealing the end of each of said cylinders on the other side of the pistons therein.

6. Shock absorbing system as claimed in claim 4 in which the hydraulic shock absorbers are of the piston type and said first and second conduits establish communication between their respective absorbers on one and the same side of said pistons, and in which spring supported plungers are movably guided in and seal said shock absorbers on the side of said pistons opposite said conduits.

7. Shock absorbing system for a vehicle having a plurality of wheels comprising hydraulic shock absorbers individually coordinated to said wheels for exerting forces thereon counteracting springing movements of said wheels relative to the body of said vehicle, each of said shock absorbers including a cylinder and a piston movable therein, and compensating means including means interconnecting said shock absorbers consisting of a plurality of conduits connecting the cylinders of said shock absorbers on one side of the pistons therein and spring-supported plungers movably guided in each of said cylinders and sealing the ends of said cylinders on the side of the piston therein opposite to said conduits.

References Cited in the file of this patent
UNITED STATES PATENTS

| | | |
|---|---|---|
| 1,066,712 | Cooper | July 8, 1913 |
| 1,201,622 | Putnam | Oct. 17, 1916 |
| 2,184,202 | Tschanz | Dec. 19, 1939 |
| 2,926,023 | Kraus | Feb. 23, 1960 |